June 13, 1933.  K. R. MANVILLE  1,913,842

SELF OILING DIFFERENTIAL

Filed Dec. 28, 1932

INVENTOR
Keith R. Manville,
BY
Redding, Greeley, O'Shea & Campbell
HIS ATTORNEYS Patented June 13, 1933

1,913,842

UNITED STATES PATENT OFFICE

KEITH R. MANVILLE, OF HIGHLAND PARK, NEW JERSEY, ASSIGNOR TO INTERNATIONAL MOTOR COMPANY, OF NEW YORK, N. Y., A CORPORATION OF DELAWARE

SELF-OILING DIFFERENTIAL

Application filed December 28, 1932. Serial No. 649,171.

The present invention relates to oiling devices for enclosed rotating mechanisms, such as differential mechanisms of motor vehicles and embodies, more specifically, an improved oiling mechanism by means of which the interior of a closed rotating member may be adequately lubricated as long as a portion of the exterior thereof is running in oil.

While the invention is applicable to any mechanism having relatively movable parts running in a closed housing, it will be described specifically herein as applicable to a differential mechanism for motor vehicles wherein such mechanism operates within a housing which contacts with a lubricant on a portion of the exterior surface thereof. In this specific application of the invention it is of particular importance by reason of the difficulty now experienced in satisfactorily lubricating the interiors of differential mechanisms on motor vehicles.

An object of the invention, accordingly, is to provide a lubricating mechanism for enclosed rotating members by means of which the said members may be maintained adequately lubricated during operation.

A further object of the invention is to provide a lubricating mechanism for enclosed rotatable members wherein the starting and stopping of the members is utilized to enable a lubricant to be directed into the housing for the members.

A further object of the invention is to provide an enclosed differential mechanism having means embodied therein to effect the lubrication of the interior thereof.

A further object of the invention is to provide an enclosed differential mechanism having lubricating ducts formed therein to direct lubricant into the interior of the mechanism and preserve a predetermined lubricant level therein at all times.

Further objects, not specifically enumerated above, will be apparent as the invention is described in greater detail in connection with the accompanying drawing, wherein.

Figure 1:
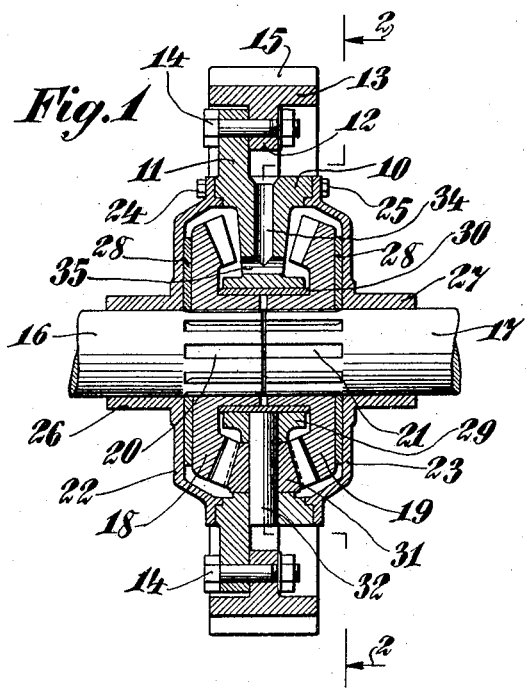
Figure 1 is a view in transverse section, taken in a plane passing through the axis of a differential mechanism constructed in accordance with the present invention, the plane being indicated at 1—1 in Figure 2, and looking in the direction of the arrows.

With reference to the above drawing, a differential spider is shown at 10, having a peripheral flange 11 to which a cooperating flange 12 of a driving ring 13 is secured by means of bolts 14. The driving ring 13 may be formed with gear teeth 15 and driven in any well known fashion in order that power may be supplied to the differential mechanism to be apportioned between coaxial driven shafts 16 and 17. The driven shafts 16 and 17 are provided with driven bevel gears 18 and 19, splined to the respective shafts at 20 and 21. Upon opposite sides of the spider 10, housing plates 22 and 23 are secured, as by means of bolts 24 and 25, respectively. The housing plates are formed with sleeves 26 and 27, respectively, within which the shafts 16 and 17 may be journaled. Between the housing plates and respective bevel gears, bushings 28 may be provided to take the driving reactions between the bevel gears and driving means therefor.

The spider 10 is formed with a central hub portion 29 within which the hubs of the bevel gears 18 and 19 may be journaled, a cylindrical bushing 30 being provided between the bevel gear hubs and hub 29. Planetary pinions 31 are journaled upon pins 32, mounted between the outer portions of the spider 10 and its hub 29.

Arms 33 are formed between the outer portion of spider 10 with the hub 29. Radial ducts 34 are formed preferably spaced at 120° about the spider. These radial ducts communicate with transverse ducts 35 which communicate with the interior of the housing formed by plates 22 and 23, as will be seen in Figure 1.

Figure 2:
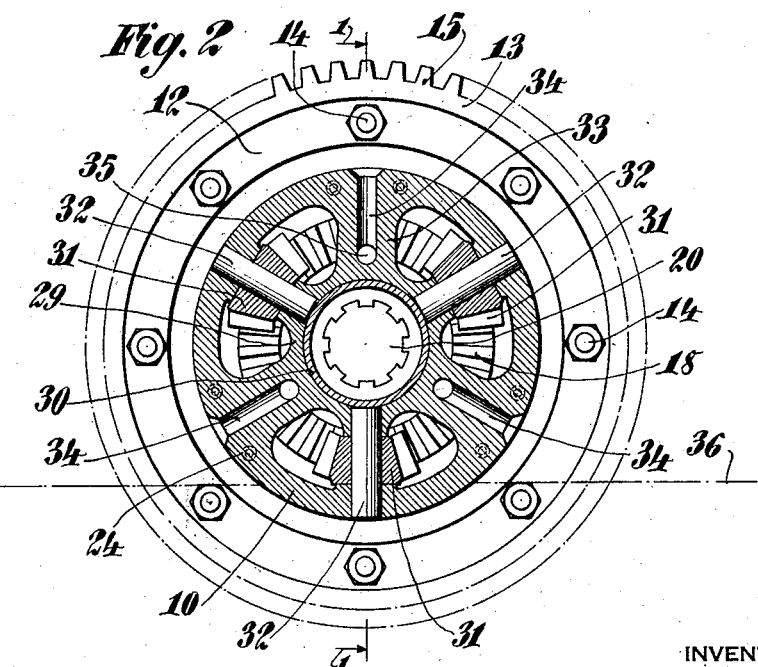
Figure 2 is a view in section, taken on line 2—2 of Figure 1, and looking in the direction of the arrows, this view showing the elements of the construction shown in Figure 1.

When the mechanism stops rotating, the oil is warm and fluid and thus drains down from the surface of the driving ring and flange 11 into the ducts 34 which are above the level of the axis of the mechanism. The oil which enters ducts 34 flows through ducts 35 into the interior of the housing and thus effectively lubricates the bevel gears and journal bearings therein. The exterior of the differential mechanism preferably runs in oil, the level of which is actuated by the dot and dash line 36 of Figure 2. The construction should preferably have three or more oil passages as described in order that at least one of the passages will be above the center of the mechanism at all times.

From the foregoing, it will be seen that the differential mechanism will be effectively lubricated at all times and the operation and efficiency thereof greatly improved. Obviously, the invention may be applied to any rotating device having relatively movable parts enclosed in a fluid tight rotating housing by causing a portion of the surface of the housing to run in oil or be supplied with a lubricant in some suitable fashion.

While the invention has been described with specific reference to the accompanying drawing, it is not to be limited, save as defined in the appended claims.

I claim as my invention:

1. A differential mechanism comprising a spider, means to drive the spider, an annular hub and inwardly extending portions between the spider and hub, planetary pinions on the spider between the hub and outer portions of the spider, bevel gears driven by the pinions, a housing on the spider for the gears and pinions, and ducts in the inwardly extending portions communicating between the exterior of the housing and exterior thereof between the spider and hub.

2. A differential mechanism comprising a spider, means to drive the spider, an annular hub and inwardly extending portions between the spider and hub, planetary pinions on the spider between the hub and outer portions of the spider, bevel gears journaled in the hub and driven by the pinions, a housing on the spider for the gears and pinions, and ducts in the inwardly extending portions communicating between the exterior of the housing and interior thereof between the spider and hub.

3. A differential mechanism comprising a spider, means to drive the spider, a hub and inwardly extending portions on the spider, planetary pinions on the spider between the hub and outer portions of the spider, bevel gears driven by the pinions, a housing on the spider for the gears and pinions, and radial ducts in the inwardly extending portions terminating in transverse ducts spaced from the housing and between the spider and hub.

4. A differential mechanism comprising a spider, means to drive the spider, a hub and inwardly extending portions spaced 120° about the spider, a hub and inwardly extending portions on the spider, planetary pinions on the spider between the hub and outer portions of the spider, bevel gears driven by the pinions, a housing on the spider for the gears and pinions, and ducts in the inwardly extending portions communicating between the exterior of the housing and between the hub and spider.

5. A differential mechanism comprising a spider, a peripheral flange on the spider, a driving ring on the flange, inwardly extending portions and a hub on the spider, a hub and inwardly extending portions on the spider, planetary pinions on the spider between the hub and outer portions of the spider, bevel gears driven by the pinions, a housing on the spider for the gears and pinions, and radial ducts in the inwardly extending portions extending from adjacent the flange and terminating in transverse ducts spaced from the hub on the interior of the housing.

This specification signed this 19th day of December, A. D. 1932.

KEITH R. MANVILLE.